United States Patent [19]

Womack

[11] 4,248,211
[45] Feb. 3, 1981

[54] STELLATE SOLAR COLLECTOR

[75] Inventor: Robert R. Womack, 5513 Nashua Rd., Virginia Beach, Va. 23462

[73] Assignees: Robert R. Womack, Virginia Beach; Stanley M. Jones, Norfolk; W. Shanks, Jr., Virginia Beach, all of Va.

[21] Appl. No.: 75,560

[22] Filed: Sep. 14, 1979

[51] Int. Cl.³ ............................................... F24J 3/02
[52] U.S. Cl. .................................. 126/446; 126/449
[58] Field of Search ............... 126/438, 446, 417, 449; 60/639, 641; 415/63, 80

[56] References Cited

U.S. PATENT DOCUMENTS

| 1,880,747 | 10/1932 | Bowen | 415/80 |
| 2,215,945 | 9/1940 | Vincent | 415/63 |
| 2,597,890 | 5/1952 | Monk | 60/641 |
| 3,886,998 | 6/1975 | Rowekamp | 126/449 |
| 4,061,129 | 12/1977 | Wilson | 126/436 |
| 4,112,920 | 9/1978 | Hillman | 126/438 |

Primary Examiner—Samuel Scott
Attorney, Agent, or Firm—David H. Semmes

[57] ABSTRACT

A solar collector device of the type adapted for heating water and the like. An elongated, opaque collector is provided with a plurality of radially extending vanes so as to define a hollow interior of stellate cross-section. Water is sprayed through a feeding conduit which extends through the hollow interior. As the sprayed water accumulates upon the interior vane surfaces, the collector wheel is rotated according to the weight of the deposited water. As the vane tips are rotated downwardly, the water is heated by conductive contact with the interior vane surfaces and by convection and radiation within the hollow interior. The heated water is then discharged downwardly through apertures in the vane tips into a collector pan. The invention is distinguished from the prior art in its introduction of the water upon the interior surfaces of collector vanes within a paddle wheel of stellate configuration, rather than upon the exterior surfaces of the vanes. The stellate configuration provides an increased area of exposure to the radiation of the sun within a compact unit and provides heating of the water by conduction, convection and radiation.

14 Claims, 9 Drawing Figures

STELLATE SOLAR COLLECTOR

BACKGROUND OF THE INVENTION

1. Field of the Invention

Solar collectors, particularly adapted for heating of fluid.

2. Description of the Prior Art

Wilson U.S. Pat. No. 4,061,129 discloses a solar furnace heating system wherein the fluid to be heated is conveyed across the exterior surfaces of a series of vane type heat collectors rotatably mounted within the collection chamber.

There is no suggestion of admitting water or any type of fluid *centrally* of Wilson's vane type collector element. Wilson's vane type collector elements are provided simply for an increase of effective collector area over conventional prior heat collectors.

SUMMARY OF THE INVENTION

According to the present invention, the solar collector is defined as an elongated paddle wheel of stellate cross-section. The paddle wheel may be mounted upon an inclined axis defined as a perforated conduit. Water is introduced through the foraminated conduit such that droplets are sprayed laterally at one side and onto the interior surfaces of the paddle wheel vanes. As water accumulates within the tips of the vanes, gravity induces turning of the vanes with accumulated water being discharged through the abutting vane tips at the nadir of rotation. This heated water may then be drained and transported to a reservoir or other heat transfer device. The vanes may be metallic with exterior surfaces blackened and the interior surfaces reflective. Modifications of the invention include introducing air into a chamber containing the collector as a humidifying or *dehumidifying* device, depending upon the presence of water. Also, pumping of water through the conduit may be varied, according to ambient temperature requirements or heat transfer demands. In addition, exteriorly supported reflector elements *may* be employed to intensify the radiation effect upon the solar collector. The prior art is devoid of any showing of exterior reflector elements in combination with a paddle wheel type collector.

The present stellate solar collector utilizes a paddle wheel configuration to achieve rotation and maintain a constant relationship of the vanes with respect to the sun. An equally important aspect is the concentration of an enormous amount of collection surface, confined within a small space. The unique paddle wheel vane collection surface enables maximum absorption, since there is no surface to reflect the rays outward. Also, exterior reflectors may be positioned to intensify the available radiation imposed upon the collector surface vanes.

The direct water spray system is employed to remove the energy in the fastest manner possible. As will be apparent, the present construction enables the following:

1. Increased surface for collection;
2. Enhanced concentration of radiation upon the reflector vanes by use of external reflectors;
3. Trapping the maximum radiant heat within a minimum space;
4. Transfer of the largest volume of heat within the shortest time to a storage facility;
5. Virtual elimination of the necessity for outside energy sources, other than spraying the water.

DESCRIPTION OF THE PREFERRED EMBODIMENTS

Figure 1:
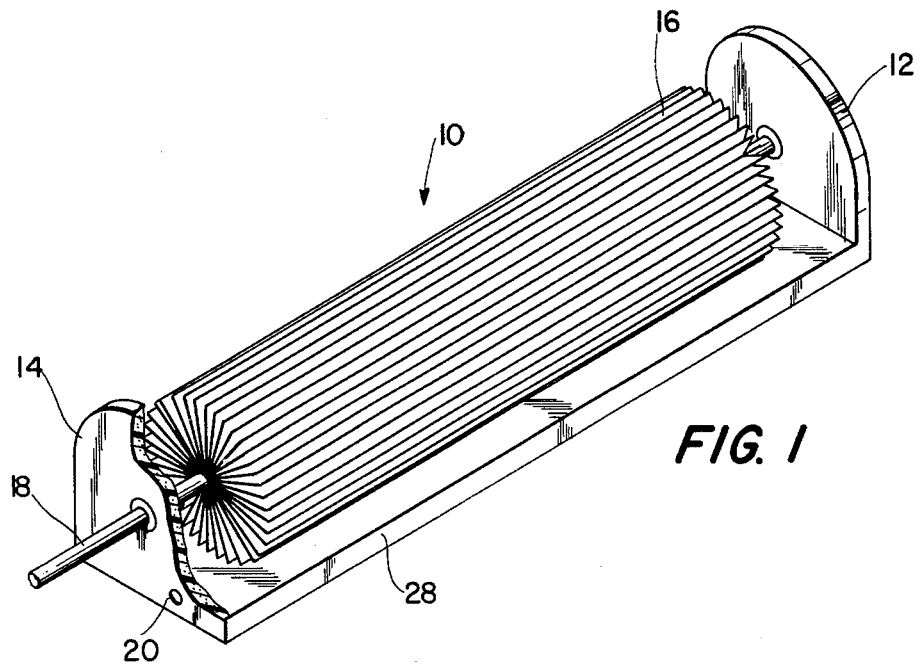
FIG. 1 is a perspective view of the solar reflector showing the elongated collector drum of stellate cross-section which may be mounted upon a horizontal or *inclined axis.*

Applicant's purpose, method and application have been defined as follows:

Purpose

To collect the sun's radiation in the most efficient manner possible.

Method

A. Use a material that conducts heat—aluminum is the third best conductor. Silver being first and copper second. Cost versus efficiency dictates that aluminum is to be used.

B. Expose as much surface in the least possible space. The stellate cross-section design gives a maximum exposed area in a small diameter. By rotating the "stellate drum" all the surface is exposed to the sun.

C. Use a color and surface that absorbs heat. A flat (non-glossy black) surface will absorb heat better than any other color or finish.

D. Trap as much radiation as possible. Radiant heat travels in a straight line until it is refracted, reflected or absorbed. The stellate design reflects rays (any that are not already absorbed) back to its own surface giving more concentration, thus a higher temperature potential. By use of a reflector the concentration is intensified to create more heat.

E. Increase the ability to absorb more by rapidly removing the heat from the aluminum. Water will insulate itself and inhibit its ability to absorb. By forcing the water into a spray and directing it to the aluminum surface it readily absorbs the heat from the aluminum. As the metal cools and is rotated away from the sun, the metal is then prepared for greater absorption when the cycle repeats itself and again is exposed to the sun's rays.

As will be apparent, the forcing of the liquid into a fine spray achieves the effect of refrigeration wherein a liquid is changed to gas in order to absorb heat.

Efficiency

A. Use as few parts as possible to cut cost. Due to the design the size is reduced, requiring less material.

B. Use existing kenetic energy produced by flowing wate to rotate the drum.

C. Only one transfer of heat from collector to storage medium (water).

D. Water is used for storage of heat, as it has the greatest heat capacity of any common substance.

E. The aluminum drain tray is flat black to give additional collecting surface.

F. The only operating cost is one small electric water pump. The energy used by the pump is partially recovered in heat picked up by the water when going through the pump and pipe and when forced through the spray holes. This force is also used to turn the drum which gives off heat at the two nylon bearings, which are the only friction points.

G. With three sides exposed, the collecting surface is always at the proper attitude to the sun regardless of the time of day or year.

H. The only insulation required is the back side. The other sides are insulated by the dead air space and a clear radiation reflective coating applied to the inner-glass surface.

I. No anti-freeze solution is required. As the water is not circulating in a freezing condition, damage by freezing is eliminated. The small amount which could remain in the drum would be in a V-shaped crevice, which will allow for expansion. In the collector there is an inclined axis which facilitates ready drainage into the collector tray, eliminating the necessity for pumps.

Versatility of Use

A. As a water heater.
B. As an air heater.
C. As an air and water heater, plus humidifier or dehumidifier.
D. Adaptable to convert radiation to electrical energy.

Practical Application for Construction

A. May be used on ground.
B. For use on slanted roof of any angle (with adjustable supports).
C. On flat roofs.
D. On multi-storied buildings.
E. Light weight—does not require special support to the roof structure.

Durability—Materials Consist of

A. Clear plastic outer cover. Has an extremely long life and a high impact resistance. Not affected by the elements.
B. Clear glass inner cover. Long life and protected from breakage by outer cover.
C. Stellate drum of aluminum will not rust. Has an extremely long life. A corrosion inhibitor is applied to the surface to make the drum last almost indefinitely (as long as inhibitor is maintained).
D. Bearings are of nylon for long life with no effects from water.
E. Collector tray is aluminum.
F. Foam insulation should require no maintenance.

Repairing

Ease and simplicity of construction make repairs unnecessary. Anyone could replace parts as easily as changing an auto tire (in the average home model).

Protection Against Leaks

As there is no need for protection from soldered joints in the collector the design dictates little concern of leakage. The drain tray and flow pipe are the only susceptible locations for leakage. This would be minimal with proper construction.

Accordingly, in FIG. 1, solar collector 10 is illustrated as including horizontal base 28 with vertical end elements 12 and 14, supporting perforated conduit 18, about which the elongated collector drum of stellate cross-section rotates.

Figure 2:
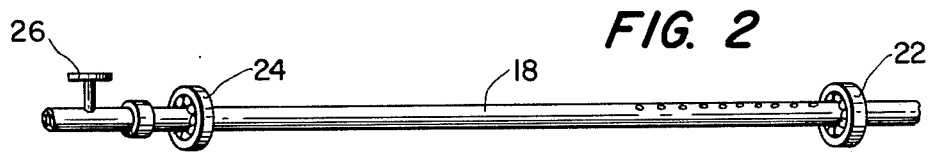
FIG. 2 is a front elevation of the perforated conduit upon which the drum is rotatably mounted.

FIG. 2 there is illustrated more particularly the perforated conduit 18, supported at either end in annular bearing elements 22, 24 and connected to a source of pressurized water by valve 26.

Figure 3:
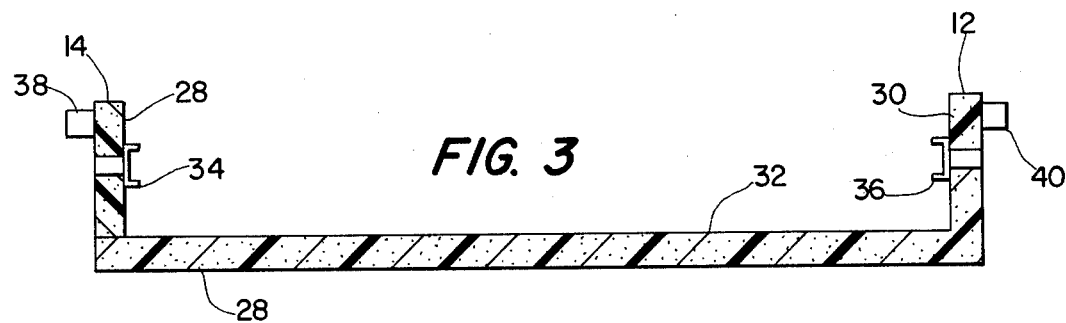
FIG. 3 is a front elevation of the base, showing the vertical end elements for support of the conduit.

In FIG. 3 the base 28 and vertical end elements 12 and 14 are illustrated as including expanded foam insulation and having aluminum inner surface covers 28, 30 and 32 painted black or opaque.

Figure 4:
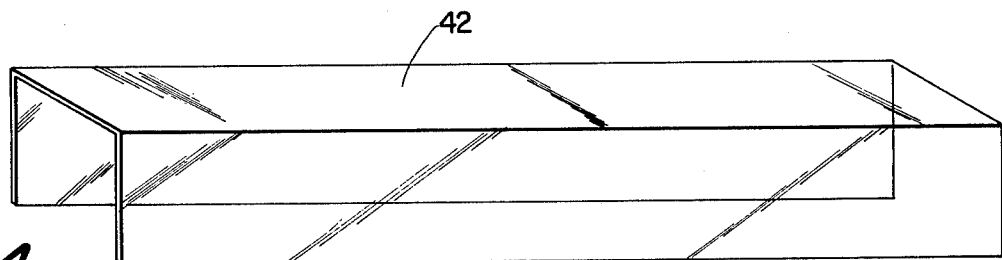
FIG. 4 is an elevational view of the outer plastic cover.
Figure 5:
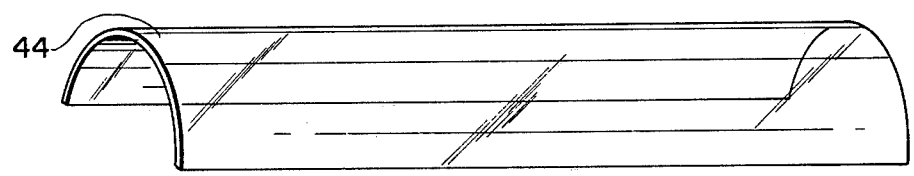
FIG. 5 is an elevational view of the arcuate, inner glass cover.
Figure 6:
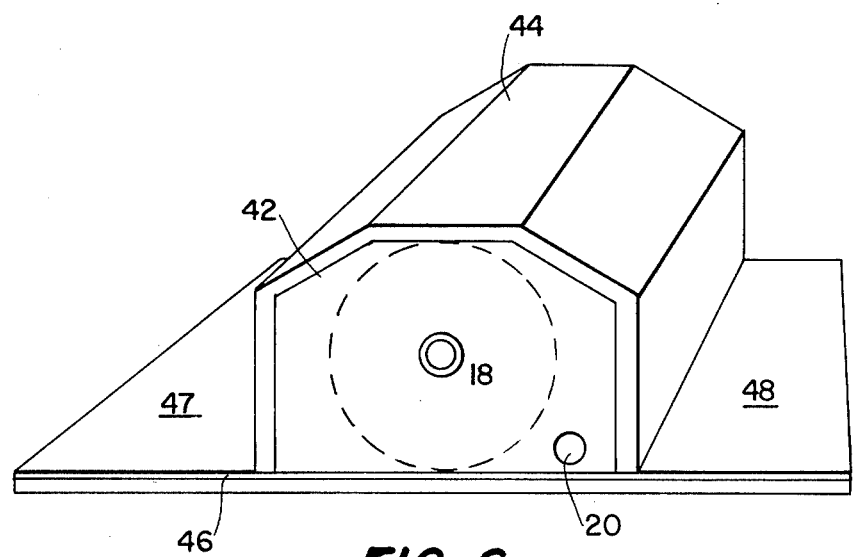
FIG. 6 is a perspective view from one end of the housing, showing the glass and plastic covers forming a dead air space, with laterally extending reflective elements, supported on either side of the collector.

In FIGS. 4, 5 and 6 there is illustrated the plastic outer cover 42 and the glass inner cover 44, defining intermediate dead air space.

Manifestly, water may be introduced at such pressures so as to spray particles laterally onto the inside of the interior surfaces of the stellate vanes, so as to create imbalance, thus inducing rotation of the collector element.

As illustrated in FIG. 6, a pair of laterally extending reflector plates 47, 48 are employed to intensify the radiation effect upon the collector drum.

Figure 7:
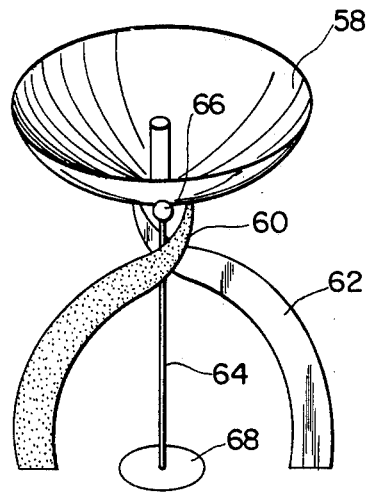
FIG. 7 is an elevational view of a parabolic reflector, which pivots, according to the movement of the sun due to the variant expansion characteristics of the metallic support elements.

Also, as illustrated in FIG. 7, a parabolic reflector 58 may be mounted upon vertical stand 64 and base element 68 by means of swivel joint 66. Two or more sheet aluminum elements 60, 62 may be employed. Each sheet aluminum element may be painted black on one side and retain its aluminum reflective surface on the other, such that movement of the sun during the day will vary expansion and contraction of the elements, thus pivoting the parabolic reflector 58 towards the sun for appropriate reflection upon the solar collector drum or the base 82 of the suggested internal expansion engine defined in FIG. 8.

Figure 8:
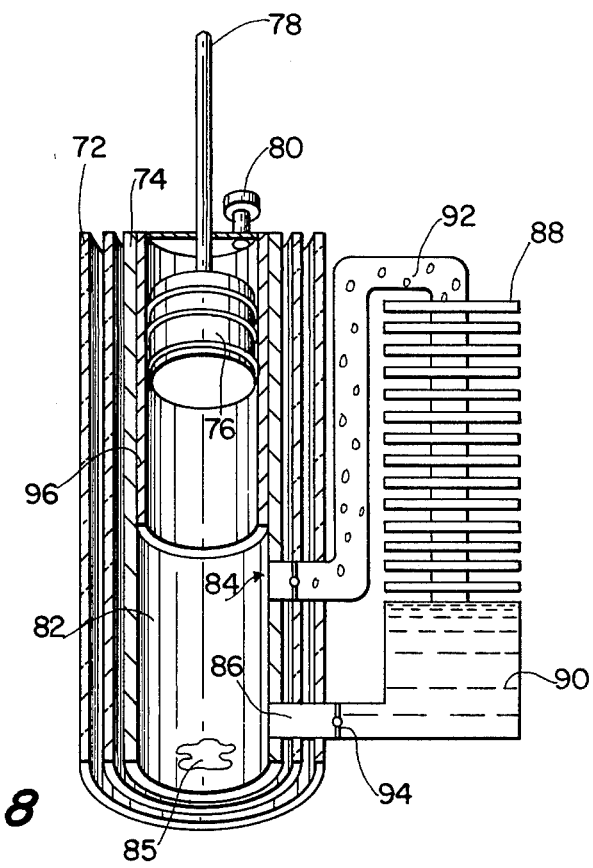
FIG. 8 is a vertical sectional view of a pumping element, utilizing a charge of Freon in its bottom portion, the Freon alternately expanding so as to urge the piston upwardly as a pump, then condensing in the condenser element for return of the Freon as liquid to the bottom of the chamber for re-cycling.
Figure 9:
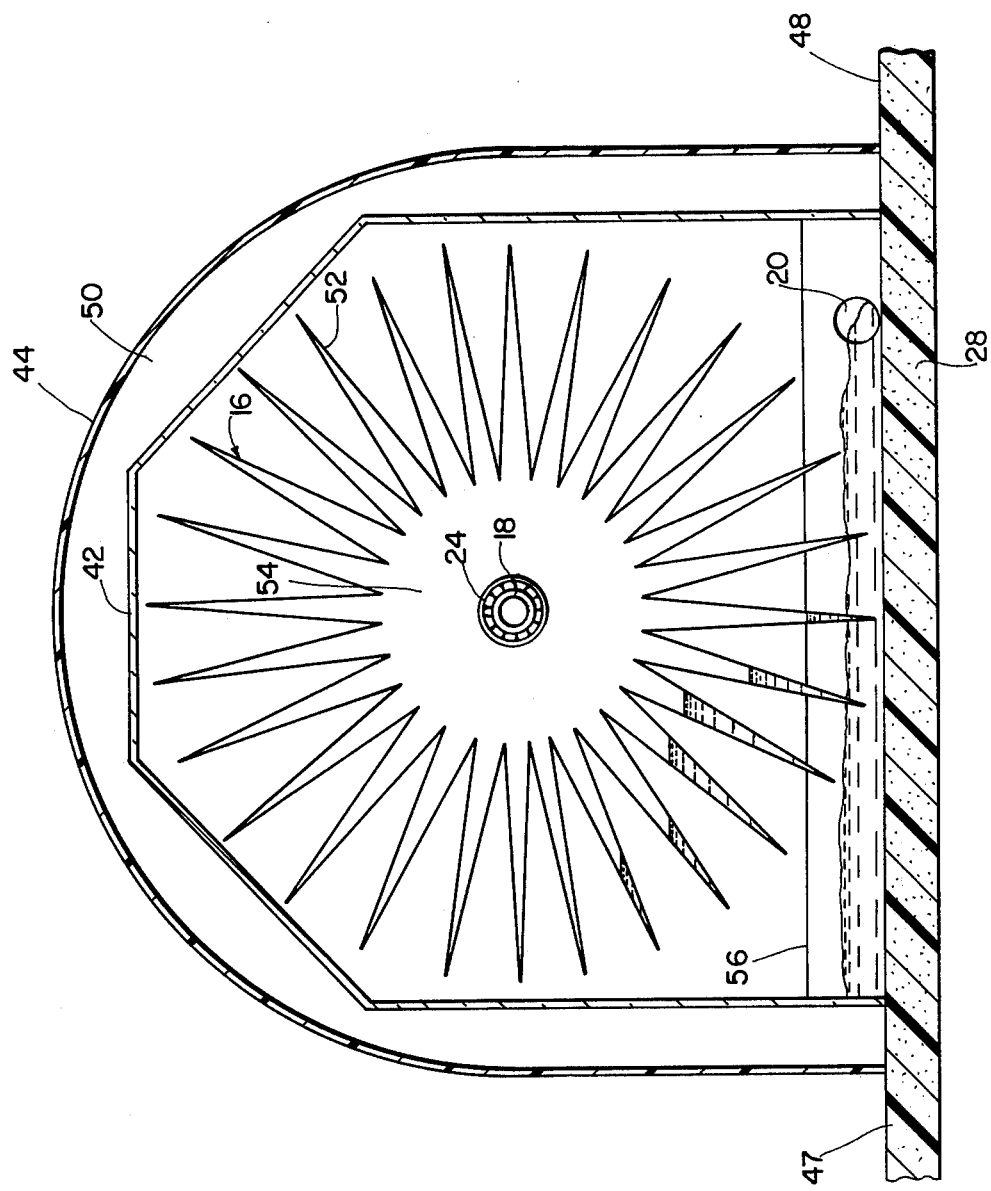
FIG. 9 is a vertical section of a solar collector, having a modified cover.

In FIG. 8 an internal expansion engine conformed as a water pumping device 72 is illustrated as including a double walled glass retainer 74 with intervening dead air space, having a black interior surface 84. A stainless steel liner or piston chamber 96 is illustrated as encompassing piston 76, having oil and compression rings, mounted upon push rod 78. An oil heater valve 80 must be employed. A condenser 88 is positioned adjacent to the chamber and is fed by means of entry conduit 86 and inlet flutter valve 94. Condensed Freon may be recycled through conduit 92 with flutter valve 95. A Freon charge 85 may be placed initially within the bottom of the chamber 82, so as to expand and push piston 76. The gasified Freon is thence condensed in condenser 88, recovered as liquid as at 90 and returned to the chamber bottom 82 for recycling and pumping action of the piston.

As will be apparent, the water or similar fluid being sprayed onto the inner surfaces of the vanes of the collector drum collects heat radiated upon the exterior surface of the range by conduction. In addition, this fluid is heated both by convection and by radiation of ambient heat within the interior of the air space. The differences in temperature upon the inner surface of the vanes and within the inner air space with respect to ambient temperature causes a high-low temperature relationship between the outer and inner surfaces, thereby generating a constant flow of warm, dry air to the interior for pre-heating of the liquid. Thus, the exterior surfaces of the vanes collect direct rays of the sun, and the interior surfaces collect both these direct rays and that which is reflected between the vanes.

Manifestly, various configurations may be employed without departing from the spirit of invention.

I claim:

1. A solar collector device of the type adapted for heating water comprising:
   A. A base;
   B. A perforated conduit supported in said base;
   C. An elongated, opaque collector drum rotatably mounted upon said conduit, said drum having a stellate cross-section defining a series of radially extending vanes abutting at their tips to define drain apertures and a hollow interior, encompassing a mid-portion of said perforated conduit; and
   D. A source of fluid connected to said conduit, such that fluid is expelled through the perforated portions of said conduit onto the interior surfaces of said vanes, so as to rotate said drum while being heated by conductive contact with the vane interior surfaces, as well as by convection and radiation within the hollow interior.

2. A solar collector device as in claim 1, wherein said fluid is water.

3. A solar collector device as in claim 2, said perforated conduit being supported, such that the perforated portions are directed laterally to one side.

4. A solar collector device as in claim 3, said base being mounted upon an inclined axis.

5. A solar collector device as in claim 4, said base being mounted upon an axis which is inclined, according to the declination of the sun.

6. A solar collector device as in claim 3, said base being mounted upon a horizontal axis.

7. A solar collector device as in claim 6, including a collector basin with drain mounted upon said base beneath said collector drum.

8. A solar collector device as in claim 7, said collector drum vanes being opaque upon their exterior surfaces and reflective upon their interior surfaces.

9. A solar collector device as in claim 8, said collector drum vanes being black upon their exterior surfaces and reflective upon their interior surfaces and including drain apertures at their abutting tips.

10. A solar collector device as in claim 6, said base including vertical ends engaging the ends of said conduit, said ends and bottom being insulated.

11. A solar collector device as in claim 8, including a clear cover supported upon said base above said collector drum.

12. A solar collector device as in claim 9, including a pair of lateral reflectors extending laterally from said base, so as to reflect sunlight onto said collector drum vanes.

13. A solar collector device as in claim 11, said clear cover including an exterior cover and an interior cover, defining a dead air space therebetween.

14. A solar collector device as in claim 10, including a pump immersed in said water, so as to urge water through the perforated conduit and onto the inner surfaces of said vanes.

* * * * *